United States Patent
Li

Patent Number: 5,090,777
Date of Patent: Feb. 25, 1992

[54] AUTOMOBILE WHEEL COVER

[76] Inventor: Kuo-Hsiung Li, 17-8, Chung Shan Rd., JenTe Hsiang, Tainan Hsien, Taiwan

[21] Appl. No.: 570,855

[22] Filed: Aug. 22, 1990

[51] Int. Cl.$^5$ ............................................. B60B 7/04
[52] U.S. Cl. .................................... 301/37 S; 301/37 R
[58] Field of Search ............... 301/37 R, 37 S, 37 SC, 301/37 CM, 108 R, 108 S, 108 SC

[56] References Cited

U.S. PATENT DOCUMENTS

| | | | |
|---|---|---|---|
| 1,943,159 | 1/1934 | Booth | 301/108 SC X |
| 1,979,895 | 11/1934 | Maker | 301/37 SC |
| 3,078,124 | 2/1963 | Mulder | 301/37 SC |
| 3,170,733 | 2/1965 | Lamme | 301/37 SC |
| 3,843,201 | 10/1974 | Buerger | 301/37 SS |
| 4,067,621 | 1/1978 | Reppert | 301/37 SC X |

*Primary Examiner*—Russell D. Stormer
*Attorney, Agent, or Firm*—Bacon & Thomas

[57] ABSTRACT

An improved automobile wheel cover, in particular a wheel cover having several catch blocks at its outer edge that are used to engage lugs of wing members to form a highly secure, easily assembled and cheaper priced automobile wheel cover. The catch blocks are removably attached to an outer cover and serve to mount the wing members.

5 Claims, 6 Drawing Sheets

AUTOMOBILE WHEEL COVER

BACKGROUND OF THE INVENTION

Today, people are pursuing not only the comfort of living but also the convenience of luxury products, among which is the automobile. However, most automotive design studies are directed toward improving their engine performance or how to get the best gas mileage and not too many on their design of the wheel or the wheel cover.

PRIOR ART

The previous generations of automobiles were mostly equipped with a wheel cover (shown in FIG. 4) which has a hole 31 at its axle cover 3 and is equipped with decorative outer cover 4 installed on it with an integrally formed bolt 41 threaded into the hold 31 of the cover 3. The outer cover 4 has several wings 42 at its sides that create a special style and characteristics. However, the integrally formed wings 42 may cause a great deal of damage when contacted by a third party if the wings 42 become accidentally hooked to the third person's clothes. In an attempt to alleviate this problem, an assembled wheel cover, shown as in FIG. 5, has been invented. Each wing of the assembled wheel cover is removable and has a trough 61, two clips 62 and two blocks 63 at its end. The wings are made of fragile plastic material and each has two angled edges 64 at its bottom two sides for close touch with the axle cover 11. Each of the wings 6 may be clipped on an outer cover 5. The outer cover 5 has several U-shaped catch blocks 51, which top portions are bent toward the outside to form a trough 52. At the bottom of the catch blocks 51, on the edge of the outer cover 5 grooves 53 are formed. When the wings 6 are made of ABS plastic material, will break, because of the pulling force, to release the hooked thing or person. However, in some instances when hooked to and pulled by an outer object, the clip 62 at one side of the wing 6 will be broken at first then the block 63 on the same side. Sometimes, the wing 6 still will not detach from the cover 5, because of the clip at other side still sticks with the outer cover 5. When the pulling force is sufficient to pull out the U-shaped catch block 51 from the outer cover 5, the cover 5 needs to be replaced.

DETAILED DESCRIPTION OF THE DRAWINGS

Figure 1:
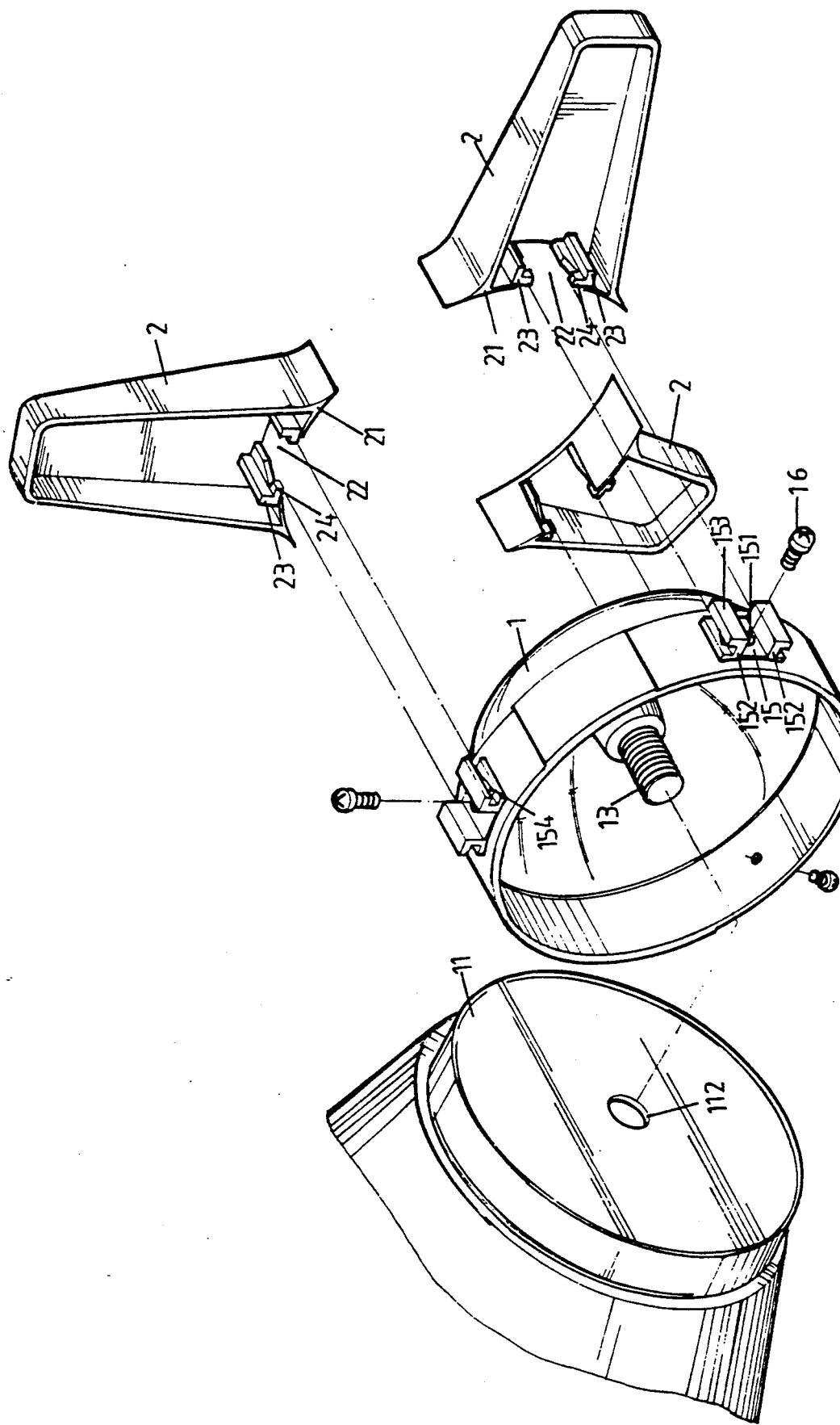
FIG. 1 is a fragmentary perspective view of the present invention.
Figure 2A:
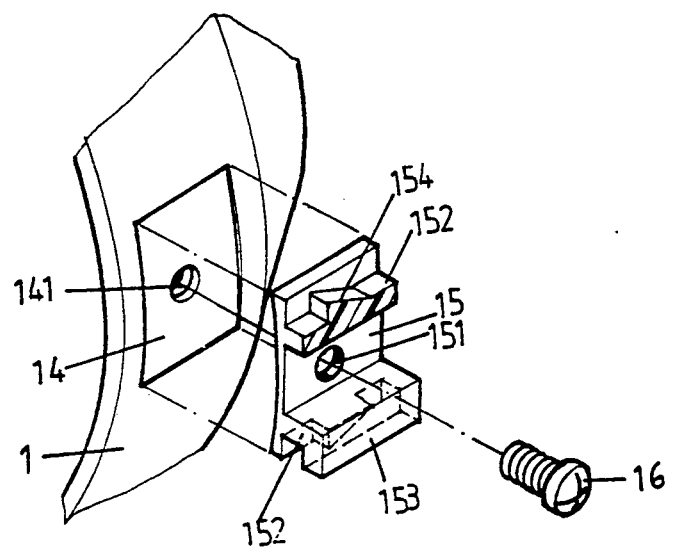
FIG. 2A is a partial fragmentary view of the present invention shown in FIG. 1.
Figure 2B:
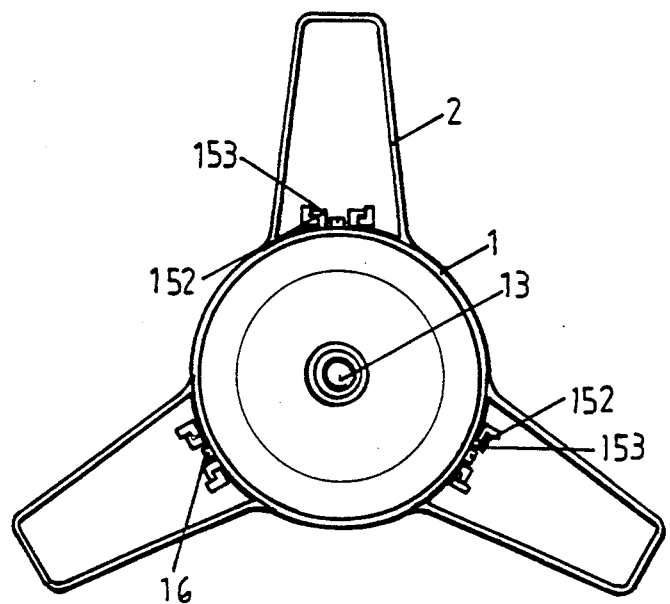
FIG. 2B is a bottom perspective view of the present invention.
Figure 3:
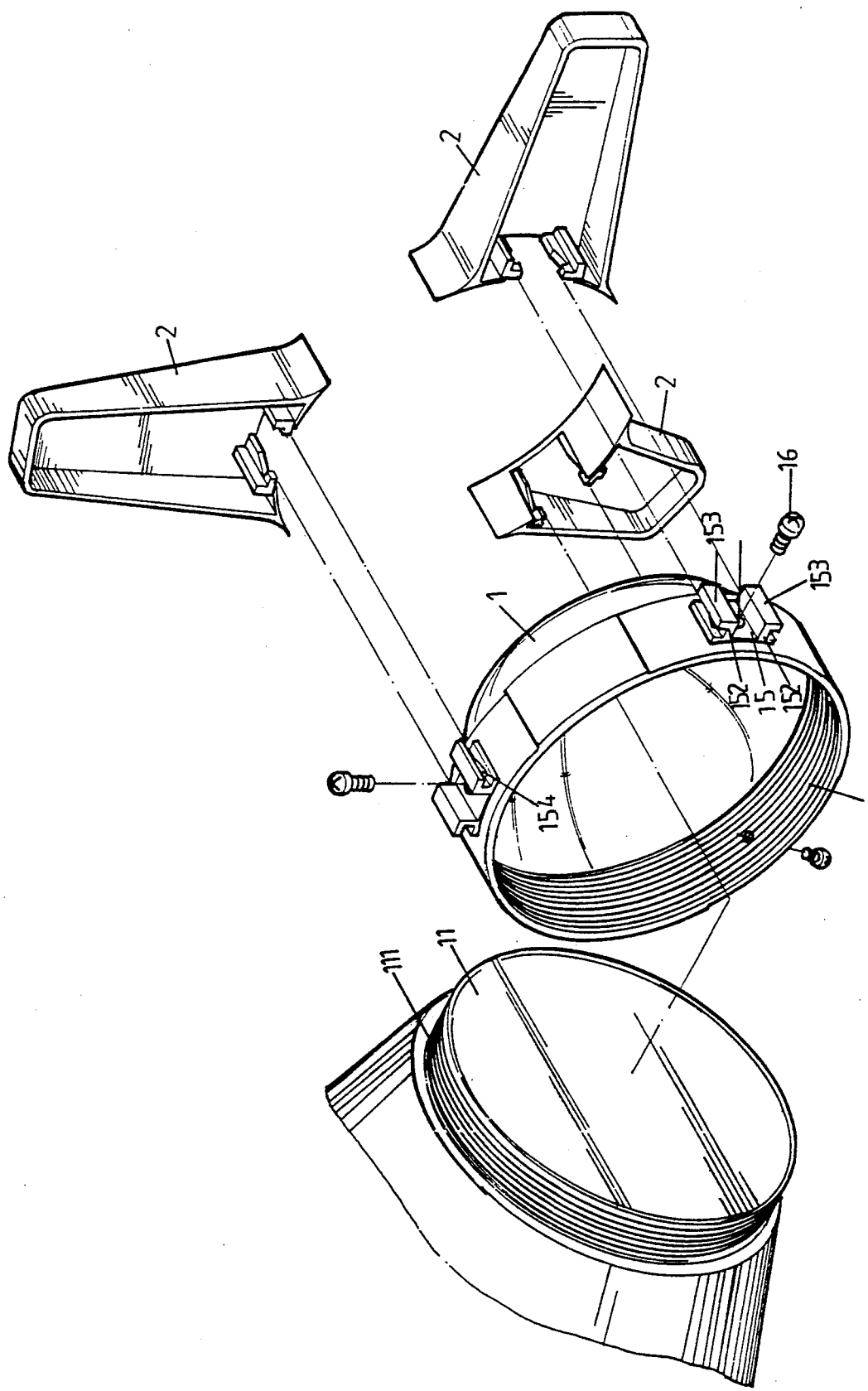
FIG. 3 is a fragmentary perspective view of a second embodiment of the present invention.
Figure 4:
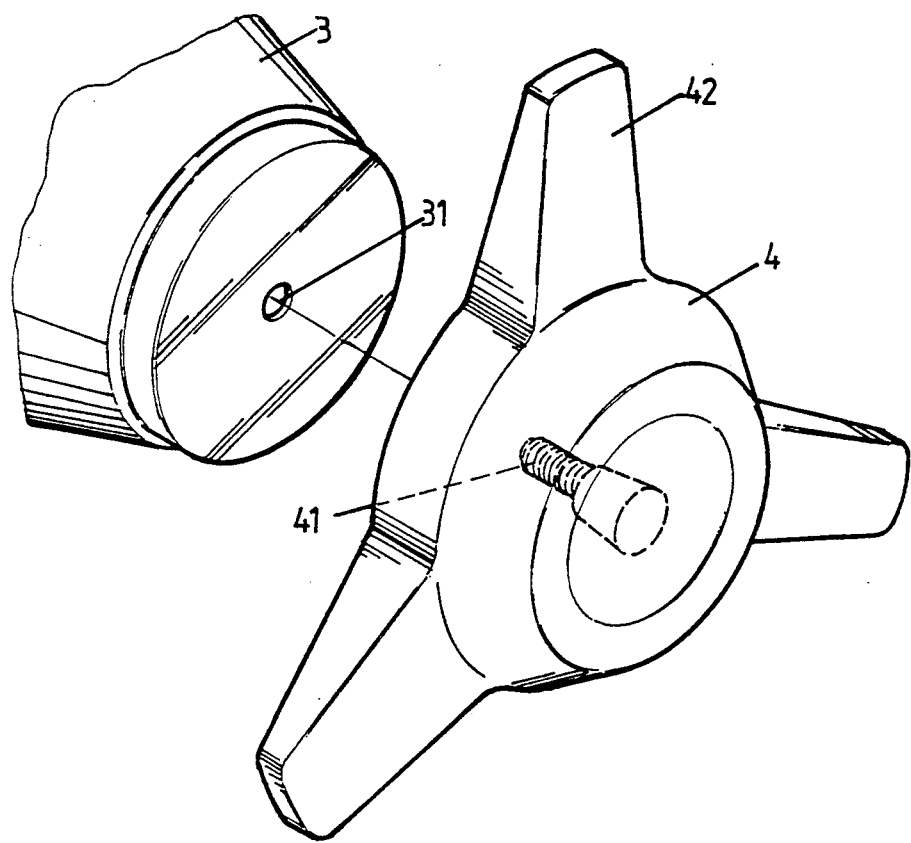
FIG. 4 is a perspective view of prior of art.
Figure 5:
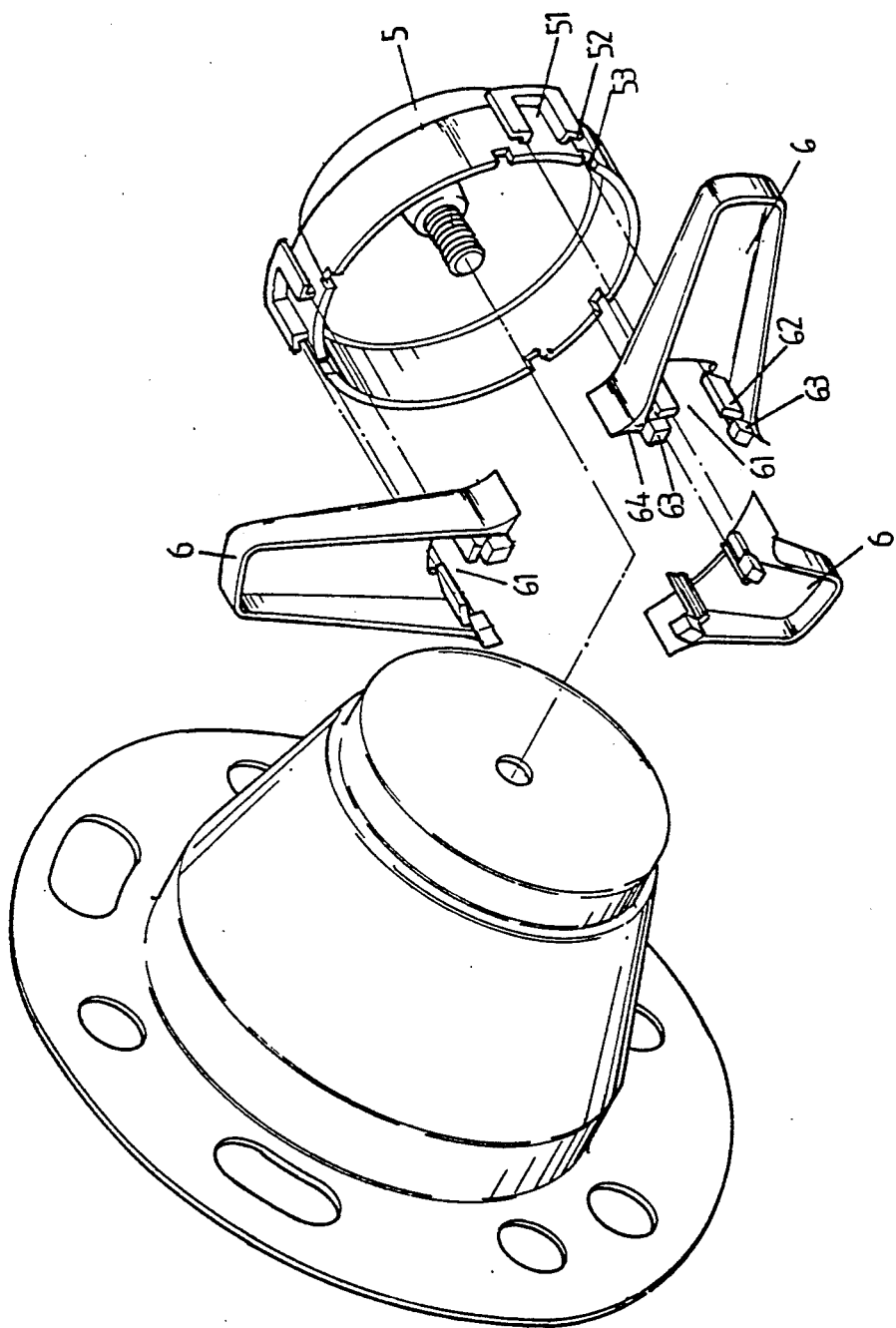
FIG. 5 is a fragmentary perspective view of an alternative prior automobile wheel cover.

With reference made to the preferred embodiments and in particular to FIGS. 1, 2A and 3, the present invention comprises an outer cover 1 and several wings 2. The outer cover 1 is shaped to match and fasten onto an axle cover 11 by a screw 13 threaded into a screw hole 112, as shown in FIG. 1, with an inner male thread 12 tightened with the female thread 111 formed on the axle cover 11, as shown as FIG. 3. The outer cover 1 has several fixture troughs 14 and a hole 141 at the center of each trough 14. On top of each of the troughs 14 a catch block 15 is fastened by a screw 16. Each catch block 15 has two ribs 152 extending outwardly from a bottom toward a top, two rails 153 extending from the ribs 152 toward the outside and two setting plates 154 located outside of the ribs 152 and underneath the rails 153. The setting plates 154 gradually extend from bottom to top so as to keep the wings 2 from sliding off. Each of the wings 2 has two arc shaped surface 21 at one end that enable the wing 2 to closely attach to the outer cover 1 and which further has a receiving trough 22 facing a catch block 15 of the outer cover 1. At both sides of the receiving trough 22 there are two L-shaped walls 23 and two lugs 24 which may slide along the catch block 15 of the outer cover 1 inwards until blocked by setting plates 154 to securely fasten the outer cover 1 and the wings 2 together.

This invention possesses the following merits when implemented:

1. Because of the wings 2 are made of ABS plastic, when hooked to or pulled by an outside object, either the rail 153 at the side, the wall 23 or the lug 24 will be broken, which will release the wing 2 from the outer cover 1 as a safety benefit.

2. Because of the structural simplicity, assembly is simplified to lower the cost so as to make it more competitive in the market.

3. Because of the assembly of the axle cover 11 and the outer cover 1 is by a screw thread the assembly procedure is faster.

4. Because the present invention uses screw 16 to fasten the catch block 15 to the outer cover 1, when one of the wings 2 or the catch blocks 15 are broken, it may be changed without the need to discard the outer cover 1.

5. The present invention may be applied with multi-color or fluorescent elements to make it more colorful and attractive.

This invention may have the outer cover 1 fastened on the axle cover 11 first before installing the wings 2 onto the outer cover 1 which makes assembly even faster.

In general, the wheel cover of this invention has special features which not only increases its value, but also makes it more safe.

I claim:

1. An improved automobile wheel cover comprising:
   a) an axle cover;
   b) an outer cover;
   c) first attachment means to removably attach the outer cover to the axle cover;
   d) at least one catch block;
   e) second attachment means to removably attach the at least one catch block to the outer cover;
   f) at least one wing member; and,
   g) third attachment means to attach the at least one wing member to the at least one catch block, the third attachment means comprising:
      i) at least one wedge-shaped setting plate defined by the at least one catch block; and,
      ii) at least one lug defined by the at least one wing member and located so as to engage the at least one wedge-shaped setting plate.

2. The improved automobile wheel cover of claim 1 wherein the first attachment means comprises:
   a) a threaded hole defined by the axle cover; and,
   b) a threaded fastening member engaging the threaded hole and the outer cover.

3. The improved automobile wheel cover of claim 1 wherein the first attachment means comprises:
   a) a first threaded portion formed on the axle cover; and,
   b) a second threaded portion formed on the outer cover adapted to engage the first threaded portion.

4. The improved automobile wheel cover of claim 1 wherein the second attachment means comprises:
   a) a threaded opening defined by the outer cover; and,
   b) a threaded fastener engaging the at least one catch block and the threaded opening.

5. The improved automobile wheel cover of claim 4 further comprising at least one recess defined by the outer cover adapted to accommodate and locate the at least one catch block.

* * * * *